W. L. BROWN & J. B. CRAMER.
Fence Wire Stretcher.
No. 165,536. Patented July 13, 1875.
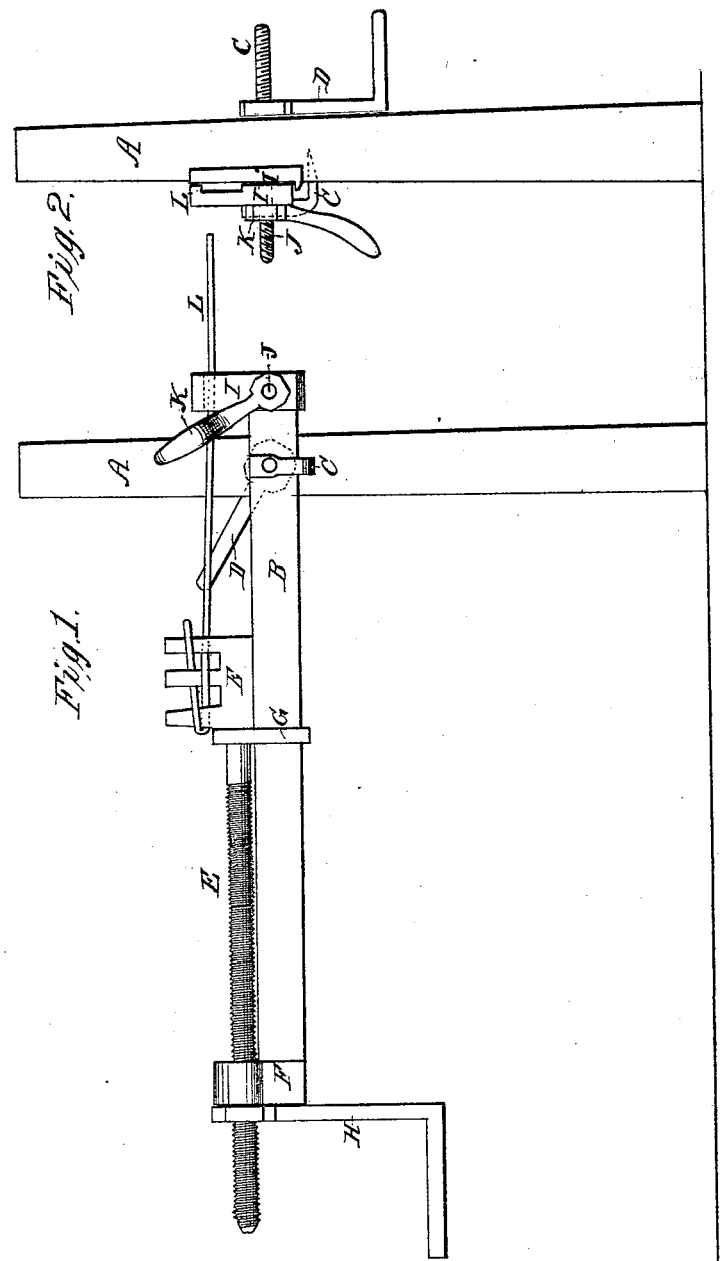
Witnesses
Frank Sniffin
J. W. Mitchell
Inventors
Warren L. Brown
Joel B. Cramer

UNITED STATES PATENT OFFICE.

WARREN L. BROWN AND JOEL B. CRAMER, OF DUNLAP, IOWA.

IMPROVEMENT IN FENCE-WIRE STRETCHERS.

Specification forming part of Letters Patent No. 165,536, dated July 13, 1875; application filed February 13, 1875.

*To all whom it may concern:*

Be it known that we, WARREN L. BROWN and JOEL B. CRAMER, of Dunlap, in the county of Harrison and State of Iowa, have invented a new and Improved Wire-Fence Tightener; and we do hereby declare that the following is a full, clear, and exact description of the same, reference being had to the accompanying drawing, forming a part of this specification, in which—

Figure 1 is a side elevation of our device as applied in practice; Fig. 2, an end view.

The object of our invention is to provide for farmers, and others having occasion to construct wire fences, a compact, portable, and efficient device for tightening or straining the wires of such fences, the same being adapted for convenient attachment to and detachment from a post, and the construction and arrangement of parts, being as hereinafter described.

The main parts of the device are a bar, B, which is attached to the fence-post A by means of a dog or spur-bolt, C, and a forked wire-tightening screw-rod, E, which is supported and slides on said bar, and a clamp-screw for holding the wire after being tightened. One jaw I of the clamp is formed on the head of bar B, and the other, I', is loose and detachable, but provided with a screw, J, formed in one piece with it, or rigidly secured to it, and which passes through the fixed jaw, and has a hand-nut, K. The shank of the dog C is screw-threaded, and a hand or crank nut, D, is applied thereto for the purpose of clamping the bar B firmly against the post A, and also maintaining it in a horizontal position. To this end the head of the dog has a spur formed on it, to enter the post, as shown, and the part between the head and screw-thread of the dog is made square or polygonal, to prevent bar A from turning on it. The screw-threaded shank of the forked rod E is guided in the socket F formed on the outer ends of bar A, and a sliding ring, G, acts as a guide for the head of the rod. To tighten a wire, the device is secured to a post, A, by means of the dog C and crank-nut D, as shown, and the end of the wire is intertwined with or coiled about the prongs formed on the head of bar E. The crank of nut H is then turned until the forked head has been drawn back to the socket F, or till the wire is taut, when the nut K is turned to clamp the wire between the jaws I I'. If sufficiently strained the wire is secured to the post in any approved manner, but if too slack the head of bar E is again adjusted near the clamp I, a new hold taken of the wire, and the operation repeated.

What we claim is—

1. The combination of the forked straining-bar and its crank-nut H with bar B, having socket F, guide-ring G, and a device for holding to the post A, substantially as described.

2. The combination, with bars B and forked rod E, of the spur-bolt or dog C, having a portion of its shank made polygonal, and a portion screw-threaded, and hand-clamping nut D, as and for the purpose described.

3. The combination of the detachable clamping-jaw I', having screw J attached, with fixed jaw I, bar B, wire-straining screw-rod E, and nut H, all as shown and described.

WARREN L. BROWN.
JOEL B. CRAMER.

Witnesses:
FRANK GRIFFIN,
J. M. MITCHELL.